United States Patent Office 3,489,596
Patented Jan. 13, 1970

3,489,596
METHOD OF REDUCING ADHESION OF ICE
Ralph E. Plump, Taftsville, Vt., assignor to the United States of America as represented by the Secretary of the Army
No Drawing. Filed Jan. 4, 1967, Ser. No. 607,602
Int. Cl. B44d 1/14, 3/08
U.S. Cl. 117—72                                     3 Claims

ABSTRACT OF THE DISCLOSURE

A process for reducing the bond strength of ice to a surface wherein an ice-releasing oil such as pristane, squalene, or squalane is applied to the surface under conditions which result in absorption by the surface of a quantity of the oil, which oil will be desorbed under icing conditions.

---

This invention relates to a method of reducing the adhesion of ice to the surface of articles which are normally subjected to icing conditions and more particularly, to a process for treating certain surfaces with an ice-releasing oil in a manner that will provide a reserve of said oil that will be effective to reduce the adhesion of ice to said surface for a number of cycles of ice accumulation and release.

Ice accumulation on surfaces exposed to icing conditions constitutes a recurring and serious threat to the operations of the electrical power, air-transportation, shipping and construction industries, to name but a few. Power line breaks, the hazards to air travel, and the unseaworthiness of vessels due to ice build-up on exposed surfaces are only too well known and it would obviously be highly desirable to have those surfaces susceptible to ice accumulation constructed so as to prevent or reduce the adhesion of ice thereto. While theoretically, at least, a liquid interface between ice and a solid substrate will prevent adhesion therebetween, there is at present no practical way known in the art to maintain such an interface.

I have discovered a process for treating certain surfaces to be described hereinafter, with an oil which comprises at least one member of the group consisting of pristane, squalene and squalane, in a manner that will provide a surface capable of releasing ice at less than 10 p.s.i. and preferably less than 5 p.s.i. shear for at least five cycles of freezing-on and releasing. Since a shear strength of zero p.s.i. is not obtained with this invention, it is of course necessary that some slight mechanical means came into play to dislodge the ice. Such means might consist of a slight sway in overhead cables, a difference in the thermal expansion and contraction between ice and substrate, mechanical vibration or actual hammering or chipping. However, for the successful operation of my invention, it is not necessary that there be any lowering of the freezing point or application of thermal energy to the interfacial bond.

It is interesting to note that the bond strength of ice to various solid surfaces can be of a very high order and in some cases can exceed the strength of the material constituting the solid surface. For example, concrete and wood in some instances are known to fail before the ice bond will shear. Even a smooth, slick or waxy surface does not guarantee a weak bond with ice and some plastic films, as for example, polyethylene terephthalate, nylon, and the acrylics, adhere strongly to ice. Highly polished metals form very strong bonds, e.g., the adhesive strength of ice to clean polished steel is of the order of 200 p.s.i. or higher. High energy surfaces such as glass, other silicates, and metal oxides form strong bonds with ice. The ice bond strength of all of these materials when measured by the shear strength test will be found to have values much higher than 10 p.s.i.

The surfaces of articles which may advantageously be treated in accordance with this invention are formed of materials which are able to absorb a quantity of one or more of the ice-releasing oils disclosed above and which will desorb a portion of said absorbed oil upon exposure to icing conditions. Suitable materials include organic polymers having low molecular dipole moments, such as polyethylene, polystyrene and polytetrafluoroethylene. The polymers may be in the form of shaped articles, films, sheets, or any other solid configuration. Other materials or substrates may be treated in accordance with this invention to effect low ice adhesion values, provided the surfaces thereof to be protected are covered with a continuous or substantially continuous layer of a low dipole moment organic polymer. Such other materials may include relatively porous materials, such as wood, fiberboard, paper, cloth, and concrete and non-porous materials, the most significant of which would be metals and metal alloys. The low dipole moment organic polymer may be applied to the aforesaid materials in the form of sheets, solutions, and as dispersed particles mixed with binders. In the case of non-porous items, such as metal, the polymer may be in the form of sheets which are cemented on the surface to be protected, or may be solvent cast films. In the case of porous materials, such as wood, solvent cast films of the polymer are preferred since such treatment serves to fill the surface pores reducing the amount of oil that will be absorbed and retains the absorbed oil at or near the surface where it can be effective in reducing the adhesion to ice. In very coarse materials such as concrete, it is desirable to use a filler such as a grout of adhesive binder and a low dipole moment polymer powder, e.g., polyethylene, to fill the course pores, and to finally apply a solution of a polymer, such as polystyrene in xylene or toluene to effect a substantially continuous surface covering.

A necessary condition for the reduction of the adhesive strength of the ice-substrate bond is the presence of a film of ice-releasing oil in the interface at the time the ice is to be released. In order to develop and maintain an oil film on the surface under icing conditions, it is essential that the oil be applied to the surface under conditions that will result in the absorption by the surface of a quantity of the ice-realsing oil, which oil will be desorbed under icing conditions to form a surface film. These conditions vary somewhat with the nature of the material being treated. In applying the ice-releasing oil to the surface of a relatively non-porous material, i.e., an article formed of the low dipole moment organic polymer, or a metal or other impermeable material covered with such a polymer, it is necessary that the oil be applied to the surface at temperatures above freezing or icing temperatures and it is preferred that the temperature of the material be above 20° C. The solubility of the oil in the polymer decreases and the oil sweats out of the polymer forming the desired surface film. On the other hand, when dealing with relatively porous materials, e.g., wood fiberboard, paper, cloth and concrete, which materials have been given a surface coating with the low dipole moment organic polymer, it is necessary that the ice-releasing oil of this invention be applied at a temperature below the anticipated icing temperatures and preferably below −6° C. This low temperature application surprisingly causes the oil to be absorbed in greater quantities than would be the case at higher temperatures and subsequent exposure of the material to higher environmental temperatures causes the oil to flood up from the pores to the surface. This action is reversible since a lowering of the temperature causes the surface film of oil to disappear within the substrate. This phenomenon is thought to be due to the combined effects of a decrease in oil volume and an increase in pore size at lower temperatures resulting in the absorption of a relatively large quantity of oil which oil will be desorbed at higher temperatures which cause a decrease in pore size and an increase in oil volume. Regardless of the nature of the material being treated, the oil is flooded over the surface one or more times and allowed to remained thereon until a substantial quantity has been absorbed or until a saturation point is reached. Excess oil is then removed from the surface.

The adhesion of ice to a surface is measured by determining the force in pounds per square inch required to shear the ice horizontally from the surface under test. Sample surfaces which are tested are mounted on metal plates and placed in a cold chamber and held for a minimum of two hours at −6.7° C. A one inch square aluminum form is placed on the test surface and distilled water at 0° C. is poured in the form to a thickness of about one-quarter inch and allowed to freeze. After an ageing period of at least one day at −6.7° C., the samples are placed in the testing apparatus and the adhesion force tested in shear, with the force being applied at the rate of 0.05 cm. per minute. The test apparatus is a positive drive, constant head speed, chart recording (plotting force v. time) tensile tester. The metal plate is placed in a clamp and the aluminum form is connected to the tensile tester so that the force is applied in a direction parallel to the faces of the test specimen. In order to determine the long lasting effect of this treatment, another quantity of water is again frozen to the same area without any further treatment, and so on with successive freezings and breaks until the results indicate a shear strength at least about 15 p.s.i.

The ice releasing oils of this invention, pristane, squalane and squalene, are commercially available products. Squalane is also known as spinacane, dodecahydrosqualene, perhydrosqualene and 2, 6, 10, 15, 19, 23 hexamethyltetracosane.

EXAMPLE I

The surface of a square sheet of ¼″ plywood was coated with a 10% solution of polystyrene in xylene. After drying, a second coat of the same solution was applied and the solvent allowed to evaporate. Pristane was then applied to the coated surface at a temperature of −10° C. An excess of oil was maintained on the surface for two hours to insure adequate absorption. The surface was then wiped dry and tested for shear strength adhesion of ice to the treated surface at a temperature of −6.7° C. The shear strength was determined utilizing the procedure described in the previous paragraph and was found to be 3 p.s.i. or less through 5 freeze cycles. The shear strength on an untreated plywood surface was by comparison so high as not to be measurable and in fact when a shear occurred, the plywood sheet failed rather than the plywood-ice bond.

EXAMPLE II

A 4 mil sheet of commercial low density polyethylene was cemented to a ¼-inch thick aluminum plate. The polyethylene surface was coated with an excess of pristane at room temperature (20° C.) which was allowed to remain on the polyethylene for two hours. After the excess pristane was wiped off the polyethylene surface, the oil treated polyethylene was placed in a cold chamber and held for 3 hours at −6.7° C. A one-inch square aluminum form was placed over the polyethylene and filled with distilled water to a level of ¼-inch. The water was frozen and allowed to age for one day at −10° C. and the sample tested for shear strength adhesion. After the ice was sheared from the sample another block of ice was formed on the sheet in the same position as for the first ice block. This procedure was repeated for seven cycles and the shear strength measurements were successively 0.6, 1.7, 1.0, 1.9, 2.8, 4.2 and 5.3 p.s.i. The ice adhesion shear strength on the same polyethylene, untreated, was 13–14 p.s.i.

EXAMPLE III

A thin slab of polystyrene, made from compacted expanded beads, was cemented to a ¼-inch aluminum panel. The polystyrene slab was coated with an excess of pristane at 30° C. and allowed to remain thereon for 3 hours after which the excess was wiped off. Ice was then frozen on as in the previous example. Shear strength measurements for 5 successive freeze cycles on the same location of the polystyrene were 2.3, 0.5, 0.5, 0.4 and 0.9. The same polystyrene, untreated, exhibited a shear strength measurement in excess of 10 p.s.i.

EXAMPLE IV

A 10% solution of polystyrene in toluene was cast as a thin coat on a slab of polished copper. After evaporation of the solvent, a second coat was applied and allowed to evaporate. The polystyrene surface was flooded with squalane at room temperature and allowed to remain for 2 hours after which the excess oil was wiped off. Ice was frozen on the oil treated surface and the shear strength measurements taken as in Example II. The shear strength measurements of successive breaks were 1.6, 0.7, 0.8, 1.5, 2.4, 3.0, 2.8 and 10.

EXAMPLE V

A ⅟₁₆-inch polytetrafluoroethylene sheet was coated with pristane at room temperature and an excess of oil maintained on the surface for two hours. The excess oil was removed and the test sheet placed in a cold chamber and held for 3 hours at −7° C. Ice was frozen on the oil-treated surface in the manner described in Example II. The ice block broke free on each of 5 cycles at the same location with each attempt to set up the shear test indicating that the shear strength was close to 0 p.s.i.

I claim:
1. A method of reducing the adhesion of ice to the surface of a porous article subjected to icing conditions, said article being other than a solid, low dipole moment organic polymer, which comprises in sequence the steps of (a) covering the surface of said article with a substantially continuous layer of polyethylene, polystyrene or polytetrafluoroethylene and (b) applying at a temperature below 0° C. an excess of pristane to the surface of said article.

2. A method according to claim 1 wherein pristane is applied to said article at a temperature below −6° C.

3. A method according to claim 2 wherein said porous material is wood, fiberboard, concrete, paper or cloth.

References Cited

UNITED STATES PATENTS

| | | | |
|---|---|---|---|
| 1,890,286 | 12/1932 | Geer | 106—13 |
| 1,998,809 | 4/1935 | Geer | 106—13 |
| 2,567,804 | 9/1951 | Davies | 117—72 |
| 3,403,045 | 9/1968 | Erickson et al. | |

WILLIAM D. MARTIN, Primary Examiner

RALPH HUSACK, Assistant Examiner

U.S. Cl. X.R.

106—13; 117—75, 76, 138.8; 252—70